E. P. COPENHAVER.
HORSE DETACHER.
APPLICATION FILED MAY 8, 1909.
962,942.
Patented June 28, 1910.
2 SHEETS—SHEET 1.
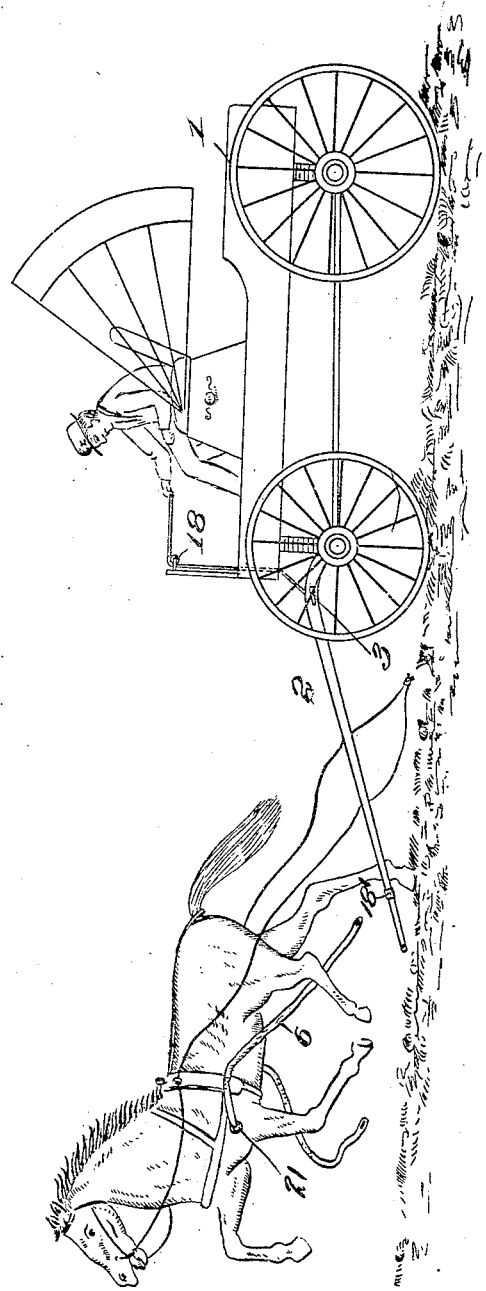
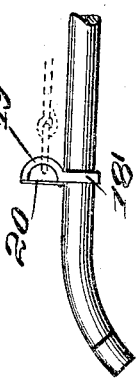

E. P. COPENHAVER.
HORSE DETACHER.
APPLICATION FILED MAY 8, 1909.
962,942.
Patented June 28, 1910.
2 SHEETS—SHEET 2.
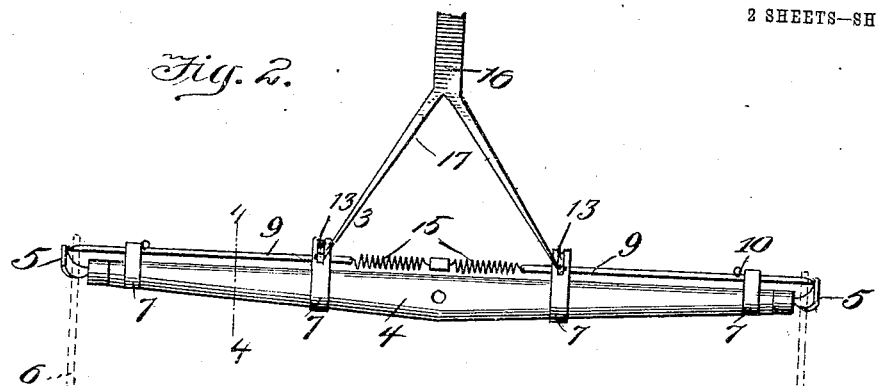
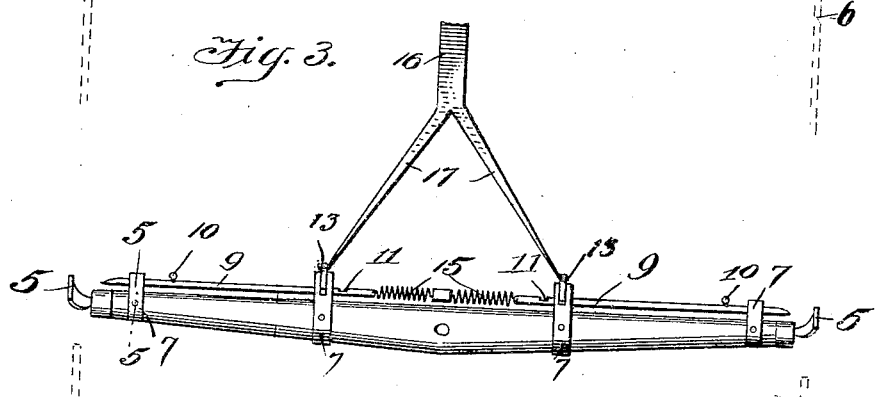
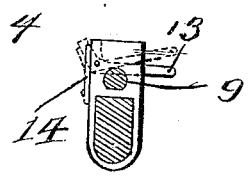
Witnesses
Inventor
Elmer P. Copenhaver.
By Victor J. Evans
Attorney

UNITED STATES PATENT OFFICE.

ELMER P. COPENHAVER, OF SPARKS, WEST VIRGINIA.

HORSE-DETACHER.

962,942.  Specification of Letters Patent.  Patented June 28, 1910.

Application filed May 8, 1909. Serial No. 494,765.

*To all whom it may concern:*

Be it known that I, ELMER P. COPENHAVER, a citizen of the United States, residing at Sparks, in the county of Nicholas and State of West Virginia, have invented new and useful Improvements in Horse-Detachers, of which the following is a specification.

This invention relates to vehicle shafts, and the invention is primarily directed to that class of shafts having means whereby an animal attached to the said shafts, becoming uncontrollable is readily released from connection with the vehicle.

The principal object of the invention is to provide a shaft having a swingletree upon which is mounted securing rods to which the traces connected with the animal are attached and the thills of the shafts being provided with a suitable catch adapted for the reception of the buckle, upon the traces at their forward ends, so that when the retaining rods are withdrawn from their connection with the rear ends of the traces the animal may readily free itself from connection with the shafts and the vehicle to which the shafts are attached.

With the above and other objects in view which will appear as the description progresses the invention resides in the novel construction and combination of parts hereinafter fully described and claimed.

In the accompanying drawing there has been illustrated a simple and preferred embodiment of the invention and in which, Figure 1 is a view illustrating the manner of detaching an animal from the vehicle. Fig. 2 is a top plan view of the swingletree attached to the shafts having its securing rods connecting the traces of the harness. Fig. 3 is a similar view illustrating the securing rods withdrawn from the traces. Fig. 4 is a sectional view upon the line 4—4 of Fig. 2. Fig. 5 is a similar view upon the line 5—5 of Fig. 3. Fig. 6 is a detail elevation of the forward end of one of the thills.

In the accompanying drawings the numeral 1 designates a wheeled vehicle of ordinary construction and the numeral 2 the shafts connected therewith. The shafts 2 have their thills secured to the vehicle 1 in the ordinary manner and the said shafts 2 are also of an ordinary construction, being provided with the usual cross or connecting bar 3. Pivotally connected with this connecting bar 3 is a swingletree 4, also of the usual construction. This swingletree has its ends provided with curved clips 5 which are adapted to serve as a bearing for the traces 6. The swingletree 4 is provided with spaced collars 7, arranged in pairs spaced away from each other from the center or pivotal connecting point of the said swingletree. The outermost collars 7 are adapted to encircle the swingletrees and are provided with a suitable circular opening or enlargement 8, while the innermost collars 7 comprise a substantially U-shaped member having arms extending rearwardly from the upper and lower faces of the swingletree. The numeral 9 designates the trace securing rods. Both of these rods 9 are of a similar construction and are each provided with an offset member 10, adapted to normally contact the inner face or wall of the U-shaped extension 8 provided upon the collar 7 and the rods are also provided with a suitable depression 11 positioned adjacent its opposite end and normally adapted to be contacted by one arm of an L-shaped lever 13.

In order to force the offset 11 into engagement with the L-shaped latch 13, the swingletree and member 7 are provided with a suitable flattened resilient element 14 which contacts the offset arm of the said latch 13 so as to normally swing the latter between the arms of the U-shaped collar and toward the sliding rods 9. The inner ends of the securing rods 9 are connected together through the medium of the tension spring 15 which normally draws the arms together through the collars 7, when the L-shaped latches 13 are withdrawn from contact with the depressions 11. In order to provide for the withdrawal of these offset arms 13, I have provided the arms with flexible connection 16 having offset or bifurcated arms 17 connected directly with the free ends of the L-shaped member 13, while the said member 16 is projected through a suitable opening in the forward part of the vehicle body 1 and is adapted to extend over a suitable pulley 18 and to have its end in close proximity with the seat occupied by the driver of the said vehicle.

From the above description taken in connection with the accompanying drawings it will be noted that when the animal attached to the vehicle becomes unruly and threatens to run away it is merely necessary to pull the strap 16 which releases the L-shaped locking members 13 from the cut away portions 11 of the rods 9 and the said rods, under the exertion of the spring 15, are retracted so as to withdraw their ends from connection with the eyes formed in the ends of the traces.

When the animal is to be attached to a vehicle provided with the improved shafts, the breeching strap may be easily disposed of, if desired and the securing rods forced in opposite directions against the pressure of the spring 15 so as to engage the eyes of the traces 6, the outward movement of the rods being limited through the medium of the offsets 10, thus allowing the rods to contact with the offset fingers 5 and securely retaining the traces upon the swingletree of the shafts. Each of the thills comprising the shafts have their outer extremities provided with a suitable collar 18′. This collar 18′ is rigidly secured to the thills in any desired or preferred manner and is provided with an upwardly extending U-shaped portion 19, and an opening provided by this U-shaped extension is normally closed through the medium of a flat resilient member 20, which has one of its ends secured to the collar and its opposite end normally contacting the free portion of the said U-shaped extension. By this arrangement it will be noted that the traces 6 may have their forward ends provided with a suitable ring or eye 21 which may be attached to the said U-shaped extension 19 and by this means obviating the necessity of connecting the traces directly with the breast strap of the harness and it will also be noted that when the securing rods 9 are withdrawn from their connection with the eyes of the traces 6, the spring 20 will readily yield upon the forward movement of the animal attached to the vehicle and thus permitting the said animal to be readily released from its connection with the vehicle. It will be further noted that by this arrangement the thills 2 are effectively supported by the ring 21 connected with the harness when the animal is attached to the vehicle. The springs 15 connecting the ends of the rods 9 are preferably two in number, each having one of their end convolutions connected with a central block as illustrated in the drawings, while their opposite end convolutions are connected with the said rods 9. By this arrangement it will be noted that the said springs 15 will exert only a sufficient pressure to withdraw the rods from their engagement with the eyes of the traces when the latter are to be detached from the thills.

From the above description, taken in connection with the accompanying drawings it will be noted that I have provided an extremely simple shaft, which may be of the ordinary construction and which is provided with means whereby an animal may be readily and easily released from the said vehicle when desired and one which entirely dispenses with the necessity of securing the traces of a harness to the breast strap thereof, as is customary, and wherein the forward as well as the rearward portions of the traces may be readily removed through the movement of the securing rods and the forward movement of the animal attached to the vehicle.

Having thus fully described the invention what is claimed as new is:

1. A shaft comprising a pair of thills and a connecting bar, a swingletree pivotally connected with the connecting bar, collars upon the swingletree, one of said collars comprising a U-shaped member having extending arms, an L-shaped latch pivotally connected between these arms, a pair of rods projecting through these collars, each of said rods being provided with a cut away portion adapted to be engaged by one arm of the L-shaped latches, a tension device between the arms adapted to normally draw the ends of said arms toward each other and a flexible member attached to the L-shaped latches, substantially as and for the purpose set forth.

2. A shaft comprising a pair of thills and a connecting bar, a swingletree pivotally secured to the connecting bar, said swingletree having its ends provided with offset members, collars secured upon the swingletree, the collars adjacent the ends of the swingletree being provided with eyes, the remaining pair of collars being spaced apart adjacent the center of the swingletree, and having L-shaped latches, a securing rod carried by each of the central and end collars, said securing rods having cut away portions adapted to be engaged by one of the arms of the L-shaped latches, means for limiting the outward movement of the securing rods, a tension device between the inner ends of the rods adapted to draw the said rods toward each other and a flexible member connected with each of the L-shaped latches, substantially as and for the purpose set forth.

3. A shaft comprising a pair of thills and a connecting bar, a swingletree pivotally secured to the connecting bar, said swingletree having its ends provided with offset members, collars secured upon the swingletree, the collars adjacent the ends of the swingletree being provided with eyes, the remaining central pair of collars being spaced apart on the swingletree, these central collars being each provided with a projecting portion having an opening alining with the eyes of the outer collars, and the said projecting portion being also bifurcated to provide an opening communicating with the transverse opening, L-shaped latches within the cut away portion provided by the bifurcation, a resilient element normally contacting the latches to force the same within the transverse opening of the extension, sliding rods positioned within the openings of each of the central collars and the end collars adjacent thereto, said rods having their inner ends provided with a slit or recess adapted to be engaged by the latches of the central collars, means for limiting the outward movement of the sliding rods, a tension device between the inner ends of the rods adapted to draw said rods toward each other and a flexible member connected with each of the L-shaped members, substantially as and for the purpose set forth.

In testimony whereof I affix my signature in presence of two witnesses.

ELMER P. COPENHAVER.

Witnesses:
 W. G. BROWN,
 J. LEE EVANS.